Jan. 1, 1946.　　　　　G. KENDE　　　　　2,392,154
BINOCULAR
Filed April 21, 1944　　　2 Sheets-Sheet 1
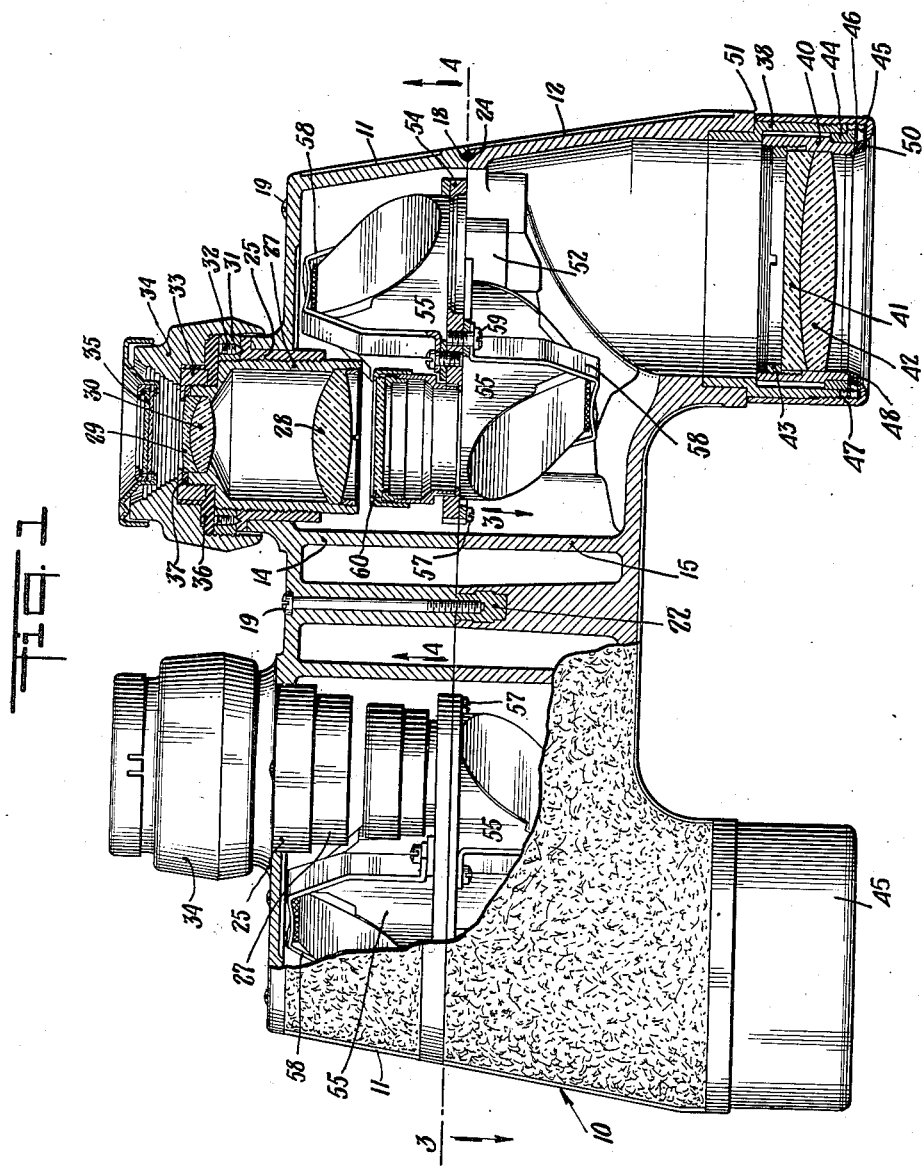
INVENTOR.
George Kende
BY
ATTORNEY Jan. 1, 1946.    G. KENDE    2,392,154
BINOCULAR
Filed April 21, 1944    2 Sheets-Sheet 2
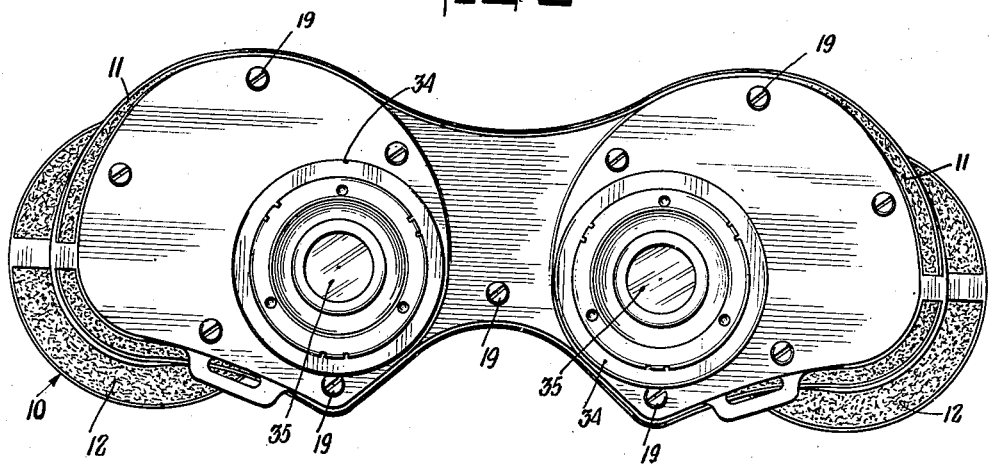
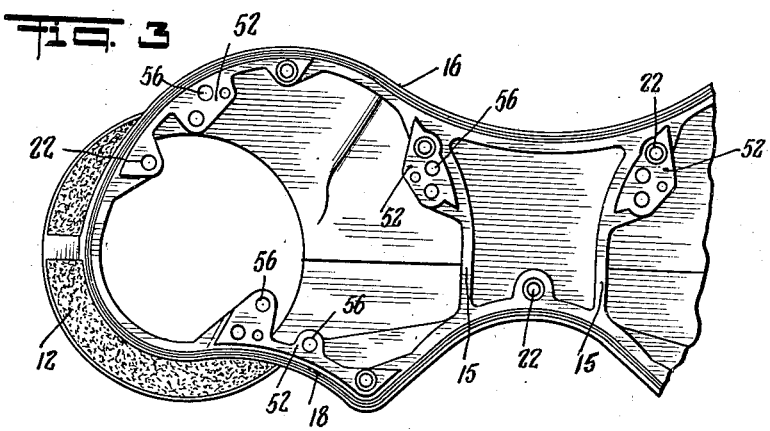
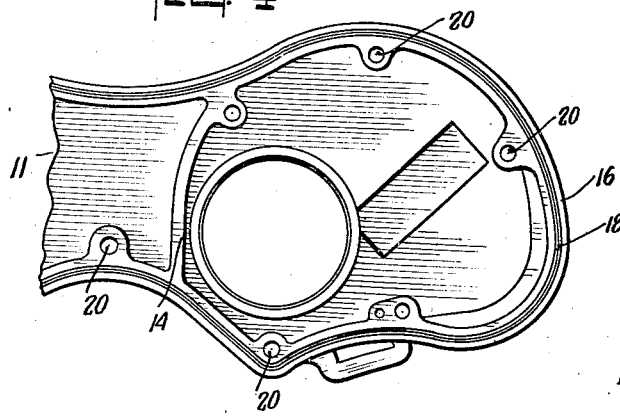
INVENTOR.
George Kende
BY
ATTORNEY Patented Jan. 1, 1946

2,392,154

UNITED STATES PATENT OFFICE 2,392,154

BINOCULAR

George Kende, Dobbs Ferry, N. Y., assignor to Universal Camera Corporation, New York, N. Y., a corporation of New York Application April 21, 1944, Serial No. 532,136

6 Claims. (Cl. 88—33)

This invention generally relates to optical instruments such as binoculars, and is more particularly directed to a novel and improved construction of the means for mounting and housing the optical elements of the instrument.

Binoculars, particularly those embodying prismatic optical systems, are usually constructed in two units each comprising a casing which carries an eye piece and incorporates the other elements required for forming an optical system, the two units being connected to one another, to form the complete instrument, by means of a hinge member permitting rotation of the units about the medial axis of the instrument. The casing is usually open at one end thereof to permit insertion of a prism cluster which is mounted on supports formed within the casing, and the eye piece is assembled upon a separate element, which is then secured to the open end of the casing and provides a closure therefor.

With this type of construction, the assembly of the various parts requires numerous operations and considerable hand fitting involving the use of skilled help, and serious difficulties are encountered in adjusting the various elements of the optical system of each unit with respect to each other, as well as in obtaining perfect parallelism between the optical axes of the systems in the two units, as is essential for the proper operation of the binocular, all of which contributes to the high cost of manufacture of such instruments. Furthermore, wear of the hinge members due to use or to infiltration of dust and moisture, which is likely to occur during the use of the instrument, often ruins collimation and renders the binocular unserviceable.

It is therefore the primary object of this invention to provide a novel construction for binoculars adapted to overcome the aforementioned shortcomings, and, more specifically, to provide a novel structure of the means for mounting and housing the elements of the optical systems whereby said elements may be assembled and adjusted in a simple and expeditious manner with a minimum of operations, and the required parallelism between the optical axes permanently insured during the life of the instrument.

The invention also contemplates the elimination of the usual left hand and right hand bodies with their interconnecting member, and the provision of a structure in which the eye pieces of the binocular are both mounted on a single rigid member, said member being adapted for assembly with a second rigid member carrying the remaining elements of the optical systems, to form the complete instrument.

It is a further object of the invention to provide members, or housing sections, as aforementioned, formed in a single piece and of rigid construction, and which embody flat terminal faces along which the members may be joined, one of said faces being provided with extensions adapted to support in predetermined adjusted position the prism clusters of the instrument.

These and other objects will become apparent in the following description of a preferred embodiment of the invention illustrated in the drawings in connection with specific optical systems, it being however understood that the invention may be applied equally well to binoculars, or in general optical instruments provided with different optical systems.

In the drawings:

Fig. 1 is an elevational view, partly in section, of a binocular according to the invention, showing a housing consisting of an upper and a lower section assembled together with the respective optical elements to form the complete instrument.

Fig. 2 is a top plan view of the instrument of Fig. 1.

Fig. 3 is a top plan view taken on line 3—3 of Fig. 1, showing the structure of the lower housing section with the optical elements removed therefrom.

Fig. 4 is a bottom plan view, taken on line 4—4 of Fig. 1, illustrating the structure of the upper housing section, from which the optical elements have been similarly removed.

Referring now in detail to the drawings, numeral 10 generally indicates the assembled housing of the instrument, which consists of the two matable housing sections 11 and 12 having one open end and suitably shaped and dimensioned to accommodate the elements of the optical systems.

Each of the housing sections is formed in a single piece and is preferably made of a moldable plastic material adapted to provide a rigid structure with a minimum of weight. The central portion of said sections 11 and 12 is provided with a pair of transverse walls, 14 and 15 respectively, integral with the peripheral walls of the respective sections and flush with the open end thereof, said transverse walls thus forming an enclosed hollow construction adapted to increase the strength and rigidity of the structure, and concurrently to define spaced chambers for the two optical systems of the instrument when the sections are assembled into a unit.

As it will be observed from the drawings, particularly with reference to Figs. 3 and 4, the open ends of the housing sections are of identical contour and are formed with a terminal flat smooth surface 16, which is provided intermediate its width with a continuous groove 18. The sections may be assembled into a unit, with their flat faces 16 in surface abutting engagement, by means of a plurality of screws 19 passing through openings 20, formed in inwardly extending portions of the upper section 11, for threaded engagement with similarly inwardly extending portions of the lower section 12, as shown at 22. It will be apparent that, when the housing sections are assembled and secured to one another as aforementioned, the grooves 18 will form a continuous channel, which may be filled with cement or other suitable material to provide a hermetic seal for the housing preventing the entrance of dust and moisture within the instrument, as shown at 24 in Fig. 1.

Both of the eye pieces of the binocular are mounted on the upper housing section 11. Each eye piece comprises a socket 25, rigidly secured to the section in any suitable manner, a tubular member or barrel 27 threadedly mounted in the socket and carrying field lens 28 and inner and outer eye lenses 29 and 30, a lock ring 31 provided with the set screw 32, the eye piece retainer 33 mounted on barrel 27, and the eye cup 34 which is mounted on the lock ring 31 and may be optionally provided with a cap carrying a ray filter 35.

As it will be noticed from the showing of Fig. 1, the penetration of dust and moisture into the eye piece and the instrument is prevented by means of wax seals suitably located in the assembly, as shown at 36 and 37.

All the remaining elements of the optical systems, including the prism clusters, are assembled on the lower housing section 12. Each objective comprises an objective socket 38 rigidly secured to the housing section, a barrel 40 which carries the inner and outer objective lenses 41, 42 secured therein by the lock ring 43, said barrel being formed with an eccentric portion cooperating with the eccentric ring 44, mounted in the socket 38, to permit lateral displacement of the objective lenses for the necessary adjustments of the optical axis of the system. A lock ring 45 and a washer 46 maintain the aforementioned parts in assembled relationship, the structure being completed by the outer tubular member 47 and the bevel ring 48 interposed between said tubular member and the barrel 39. Suitably located wax seals are provided, as shown at 50 and 51.

As aforementioned, the lower housing section 12 also carries the prism clusters forming part of the optical systems of the instrument. For this purpose, the section is provided with a plurality of lugs or projections 52 formed integral with the section and extending inwardly thereof, said lugs terminating in an upper flat face forming an extension of the flat terminal face 18, in the plane of this latter.

The lugs are opportunely arranged to provide supports for the usual apertured plates or shelves 54 on which the clusters of prisms 55 are mounted. A plurality of threaded holes 56 are provided in the lugs for engagement by the screws 57, by means of which the plates 54 are fastened to the housing section 12, the prisms being adjusted on the plates in any suitable manner and fastened thereto as by means of bands 58 and screws 59. As shown in Fig. 1, a reticle 60 may be mounted on one of the plates 54 in alinement with the corresponding eye piece.

It will be apparent from the foregoing description that I have provided a novel construction of the means for mounting and housing the optical elements of a binocular which offers many advantages as compared with the structures of the prior art because of the simplicity of construction and the ease with which the optical elements may be mounted on their respective housing sections, and these latter joined together along their terminal flat faces by means of a few screws to form a complete hermetically sealed instrument. This simplicity of construction and ease of assembly obviously also results in a considerably lower cost of production of the binocular.

On the other hand, the structure is rigid and such as to provide perfect protection for the optical systems, while insuring that the essential parallelism of the optical axes will be maintained throughout the life of the instrument owing to the elimination of those elements that are usually subject to deterioration during the use of the binocular.

It will be understood that many changes and modifications may be made in the structure described and illustrated in the drawings without departing from the spirit of the invention or exceeding the scope of the claims.

I claim:

1. In a prism binocular, a housing comprising a pair of hollow sections having one open end and embodying at their other end tubular portions for mounting the eyepieces and the objectives of the instrument, the open end of each section being formed with a flat terminal face, means for joining said sections with their terminal faces in surface abutting engagement, reinforcing walls integral with each section and extending transversely throughout the section intermediate said tubular portion thereof, and a plurality of projections integral with one of the sections extending inwardly of the terminal face thereof and each having a flat end surface co-planar with the terminal face of the section for mounting the prisms of the instrument.

2. In a prism binocular, a housing comprising an upper and a lower hollow section having one open end and embodying at their other end tubular portions for respectively mounting the eyepieces and the objectives of the instrument, the open end of each section being formed with a flat terminal face, means for joining said sections with their terminal faces in surface abutting engagement, reinforcing walls integral with each section extending transversely throughout the section intermediate said tubular portions thereof, and a plurality of projections integral with the lower section extending inwardly of the terminal face thereof and each having a flat top surface coplanar with the terminal face of the lower section for mounting the prisms of the instrument.

3. In a prism binocular, a housing comprising a pair of hollow sections having one open end and embodying at their other end tubular portions for mounting the eyepieces and the objectives of the instrument, the open end of each section being formed with a flat terminal face, means passing through inwardly projecting portions of one of the sections for joining the sections with their terminal faces in surface abutting engagement, a pair of spaced walls integral with and extending transversely throughout each section from one to the other end thereof intermediate said tubular portions of the section to define a central reinforcing enclosure in each section, and a plurality of projections integral with one of the sections extending inwardly on opposite sides of said central reinforcing enclosure and each having a flat end surface substantially in the plane of the terminal face of the section for mounting the prisms of the instrument.

4. In a prism binocular, a housing comprising a pair of hollow sections having one open end and embodying at their other end tubular portions for mounting the eyepieces and the objectives of the instrument, the open end of each section being formed with a flat terminal face, means for joining said sections with their flat terminal faces in surface abutting engagement, a pair of spaced walls extending transversely throughout each section from one to the other end thereof intermediate said tubular portions of the section, said walls being arranged for registration when the sections are joined to define with the peripheral walls of the sections a pair of spaced chambers for the right and left eye optical systems of the instrument extending throughout the housing, and a plurality of projections integral with one of the sections extending into said chambers and each having an end surface substantially in the plane of the terminal face of the section for mounting the prisms of the instrument.

5. In a prism binocular, a housing comprising an upper and a lower hollow section having one open end and embodying at their other end tubular portions for respectively mounting the eyepieces and the objectives of the instrument, the open end of each section being formed with a flat terminal face, means for joining said sections with their flat terminal faces in surface abutting engagement, a pair of spaced walls integral with each section and extending transversely throughout the section from one to the other end thereof intermediate said tubular portions of the section, said walls being arranged for registration when the sections are joined to define with the peripheral walls of the sections a pair of spaced chambers for the right and left eye optical systems of the instrument, and a plurality of projections integral with the lower section extending into said chambers and each having a flat top surface coplanar with the terminal face of the lower section for mounting the prisms of the instrument.

6. In a prism binocular, a housing comprising a pair of hollow sections having one open end and embodying at their other end tubular portions for mounting the eyepieces and the objectives of the instrument, the open end of each section being formed with a flat terminal face, means for joining said sections with their flat terminal faces in surface abutting engagement, a pair of spaced walls extending transversely throughout each section from one to the other end thereof intermediate said tubular portions of the section, said walls being arranged for registration when the sections are joined to define with the peripheral walls of the sections a pair of spaced chambers for the right and left eye optical systems of the instrument extending throughout the housing, a plurality of projections integral with one of the sections extending into said chambers and each having a flat end surface substantially in the plane of the terminal face of the section for mounting the prisms of the instrument, and means associated with the terminal faces of the sections for providing a hermetic seal at the jointure of the sections.

GEORGE KENDE.